(12) United States Patent
Wakeford et al.

(10) Patent No.: US 10,096,204 B1
(45) Date of Patent: Oct. 9, 2018

(54) SYSTEMS AND METHODS FOR DETERMINING AND IMPLEMENTING PLATFORM SPECIFIC ONLINE GAME CUSTOMIZATIONS

(71) Applicant: Electronic Arts Inc., Redwood City, CA (US)

(72) Inventors: Kent Wakeford, Hillsborough, CA (US); Tomi Huttula, San Rafael, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 166 days.

(21) Appl. No.: 15/048,903

(22) Filed: Feb. 19, 2016

(51) Int. Cl.
*A63F 9/24* (2006.01)
*G07F 17/32* (2006.01)
(Continued)

(52) U.S. Cl.
CPC ........ *G07F 17/3227* (2013.01); *G07F 17/323* (2013.01); *G07F 17/3211* (2013.01);
(Continued)

(58) Field of Classification Search
None
See application file for complete search history.

(56) References Cited

U.S. PATENT DOCUMENTS 6,527,641 B1 * 3/2003 Sinclair ................... A63F 13/12
455/456.1
6,896,618 B2 5/2005 Benoy
(Continued)

FOREIGN PATENT DOCUMENTS

WO 2014210286 12/2014

OTHER PUBLICATIONS

"Difference in Gameplay Mechanics Between Gold, Silver and Bronze" [online], Apr. 2, 2012 [retrieved Jan. 6, 2015]. Retrieved from the Internet <URL:http://forum.bioware.com/topic/309690-difference-in-gameplay-mechanics-between-gold-silver-and-bronze/>, 7 pages.

(Continued)

*Primary Examiner* — Paul A D'Agostino
(74) *Attorney, Agent, or Firm* — Knobbe, Martens, Olson and Bear, LLP (57) ABSTRACT

A system and method for determining and implementing platform specific online game customizations. The multiple platforms may include virtual reality platforms and non-virtual reality platforms. The system may monitor interactions of the users with the online game through the multiple platforms. User profiles including user information related to participating in the online game through the virtual reality platforms and the non-virtual reality platforms may be managed by the system. The system may determine user value metrics for a given user on a virtual reality platform and a non-virtual reality platform. A platform specific online game customization for the online game when played via a virtual reality platform and/or a non-virtual reality platform may be determined based on the user value metrics. The game customization that customizes one or more aspects of the online game for the given user when played via a given platform may be implemented.

16 Claims, 4 Drawing Sheets

(51) Int. Cl.
*H04L 29/08* (2006.01)
*H04L 29/06* (2006.01)

(52) U.S. Cl.
CPC ...... *G07F 17/3237* (2013.01); *G07F 17/3241* (2013.01); *G07F 17/3246* (2013.01); *G07F 17/3295* (2013.01); *H04L 67/306* (2013.01); *H04L 67/38* (2013.01)

(56) References Cited

U.S. PATENT DOCUMENTS

| | | |
|---|---|---|
| 6,913,536 B2 | 7/2005 | Tomizawa |
| 7,713,118 B2 | 5/2010 | Roemer |
| 8,147,328 B2 | 4/2012 | Carroll |
| 8,246,466 B2 | 8/2012 | Herrmann |
| 8,255,297 B2 | 8/2012 | Morgenstern |
| 8,287,383 B1 | 10/2012 | Etter |
| 8,292,743 B1 | 10/2012 | Etter |
| 8,296,781 B1 | 10/2012 | Lebaredian |
| 8,328,642 B2 | 12/2012 | Mosites |
| 8,348,747 B2 | 1/2013 | Arezina |
| 8,360,870 B2 | 1/2013 | Herrmann |
| 8,366,550 B2 | 2/2013 | Herrmann |
| 8,388,452 B2 | 3/2013 | Auterio |
| 8,527,332 B2 | 9/2013 | Selby |
| 8,814,691 B2* | 8/2014 | Haddick ............... G02B 27/017 463/30 |
| 8,944,908 B1 | 2/2015 | Wakeford |
| 9,205,338 B1 | 12/2015 | Wakeford |
| 2002/0158917 A1* | 10/2002 | Sinclair ............... A63F 13/12 715/850 |
| 2003/0119576 A1* | 6/2003 | McClintic ............... G07F 17/32 463/20 |
| 2003/0119581 A1 | 6/2003 | Cannon |
| 2003/0211889 A1* | 11/2003 | Walker ............... A63F 3/081 463/42 |
| 2005/0076002 A1 | 4/2005 | Williams |
| 2005/0113164 A1 | 5/2005 | Buecheler |
| 2005/0192097 A1 | 9/2005 | Farnham |
| 2006/0105838 A1* | 5/2006 | Mullen ............... A63F 13/211 463/31 |
| 2007/0004496 A1 | 1/2007 | Gordon |
| 2007/0066403 A1 | 3/2007 | Conkwright |
| 2008/0182664 A1 | 7/2008 | Kaplan |
| 2008/0200244 A1 | 8/2008 | Rowe |
| 2008/0234034 A1 | 9/2008 | Tessmer |
| 2008/0266250 A1 | 10/2008 | Jacob |
| 2008/0293466 A1 | 11/2008 | Arakawa |
| 2008/0300055 A1* | 12/2008 | Lutnick ............... G06F 3/011 463/39 |
| 2008/0318668 A1 | 12/2008 | Ching |
| 2009/0051114 A1 | 2/2009 | Robbers |
| 2009/0077463 A1* | 3/2009 | Koster ............... A63F 13/10 715/234 |
| 2009/0181771 A1 | 7/2009 | Sogabe |
| 2009/0181774 A1 | 7/2009 | Ratcliff |
| 2009/0318232 A1 | 12/2009 | Harris |
| 2010/0056243 A1* | 3/2010 | Czyzewski ......... G07F 17/3244 463/16 |
| 2010/0144424 A1 | 6/2010 | Rogers |
| 2010/0166065 A1 | 7/2010 | Perlman |
| 2010/0273557 A1 | 10/2010 | Miyaki |
| 2010/0279762 A1 | 11/2010 | Sohn |
| 2010/0304839 A1 | 12/2010 | Johnson |
| 2011/0093361 A1 | 4/2011 | Morales |
| 2011/0106607 A1 | 5/2011 | Alfonso |
| 2011/0312423 A1 | 12/2011 | Mosites |
| 2012/0009997 A1 | 1/2012 | Youm |
| 2012/0129598 A1* | 5/2012 | Chao .................. G07F 17/3237 463/31 |
| 2012/0150695 A1 | 6/2012 | Fan |
| 2012/0172098 A1 | 7/2012 | Baker |
| 2012/0244948 A1* | 9/2012 | Dhillon ............. G06Q 30/0209 463/42 |
| 2012/0244950 A1* | 9/2012 | Braun ................ G07F 17/3244 463/42 |
| 2012/0322545 A1 | 12/2012 | Arnone |
| 2013/0005437 A1 | 1/2013 | Bethke |
| 2013/0014033 A1 | 1/2013 | Hamick |
| 2013/0017870 A1* | 1/2013 | Parker ................... G06Q 30/02 463/1 |
| 2013/0066695 A1 | 3/2013 | Just |
| 2013/0079082 A1 | 3/2013 | Bancel |
| 2013/0079145 A1 | 3/2013 | Lam |
| 2013/0085838 A1 | 4/2013 | Tennenholtz |
| 2013/0184064 A1* | 7/2013 | Manning ............. G07F 17/3211 463/25 |
| 2013/0196757 A1* | 8/2013 | Latta ..................... A63F 13/211 463/31 |
| 2014/0031129 A1 | 1/2014 | Morrison |
| 2014/0066176 A1* | 3/2014 | LeTourneau ............ A63F 13/60 463/23 |
| 2014/0094315 A1* | 4/2014 | Stine ..................... A63F 13/12 463/42 |
| 2014/0121015 A1* | 5/2014 | Massing ............. G07F 17/3211 463/33 |
| 2014/0122720 A1 | 5/2014 | Jung |
| 2014/0128161 A1* | 5/2014 | Latta ..................... A63F 13/06 463/42 |
| 2014/0221084 A1* | 8/2014 | Morrison, III ......... H04L 67/32 463/29 |
| 2014/0274308 A1 | 9/2014 | Guinn |
| 2014/0278686 A1 | 9/2014 | Mullings |
| 2014/0302915 A1* | 10/2014 | Lyons ................. G07F 17/3225 463/25 |
| 2014/0357344 A1 | 12/2014 | Grier |
| 2014/0358651 A1 | 12/2014 | Koh |
| 2015/0005052 A1 | 1/2015 | Harrington |
| 2015/0011277 A1* | 1/2015 | Wakeford ............... A63F 13/00 463/1 |
| 2015/0170455 A1 | 6/2015 | Rad |

OTHER PUBLICATIONS

The Queen's Wrath, URL: http://destiny.wikia.com/wiki/The_Queen's_Wrath [retrieved Jan. 22, 2016] 2 pgs.
Totilo, Assassin's Creed Unity Finally Drops App, Web Requirements for Unlocks [Update], Dated Feb. 18, 2015, 5pgs.
A Cautious Celebration of Pay-or-Wait to Play Games, URL: http://www.michaelbraun.me/2014/07/a-cautious-celebration-of-pay-or-wait-to-play-games [retrieved Jan. 21, 2016] 3pgs.
World of Warcraft Armory, URL: https://play.google.com/store/apps/details?id=com.blizzard.wow&hl=en [retrieved Jan. 20, 2016] 4pgs.
Companion App (iFruit)—GTA 5 Wiki Guide—IGN, URL http:www.ign.com/wikis/gta-5/Companion_App_(iFruit)) [retrieved Jan. 20, 2016] 17pgs.
The Free GTAV iFruit and Game Manual Companion Apps, URL: http://www.rockstargames.com/newswire/article/51371/the-free-gtav-ifruit-and-game-manual-companion-apps.html [retrieved on Jan. 20, 2016] 5 pgs.
FIFA 16—Companion App—EA Sports, URL: https://www.easports.com/fifa/features/companion-app [retrieved Jan. 22, 2016] 5pgs.

* cited by examiner

SYSTEMS AND METHODS FOR DETERMINING AND IMPLEMENTING PLATFORM SPECIFIC ONLINE GAME CUSTOMIZATIONS

FIELD OF THE DISCLOSURE

This disclosure relates to a system and method for determining and implementing platform specific online game customizations.

BACKGROUND

Typically online games are played via a mobile platform, a computer, or via a game console. Incorporating a virtual reality platform for online game play may enhance the gaming experience for users. However, monetizing the online game in virtual-reality platforms may be a challenge because the immersion when playing the online game via virtual reality may encourage some users to spend currency in the online game and/or discourage other users from spending currency. Some users may get too caught up in virtual reality, while others may be more invested and willing to spend. Encouraging users, having varying reactions to virtual reality immersion, to play the online game in a manner that most effectively encourages monetization presents a unique challenge for online game providers.

SUMMARY

One aspect of the disclosure relates to determining and implementing platform specific online game customizations. The system may be configured to provide an online game that may be played via multiple platforms. The multiple platforms may include virtual reality platforms and non-virtual reality platforms. Interactions of the users with the online game when played through the virtual reality platforms and/or the non-virtual reality platforms may be monitored. The system may manage user profiles including user information based on the monitored interactions. User value metrics describing a given user's economic value to a game provider may be determined for the given user for a virtual reality platform associated with the given user, and for a non-virtual reality platform associated with the given user. Based on the user's economic value when playing the game via the virtual reality platform and/or when playing the game via the non-virtual reality platform, platform specific customizations may be determined. The platform specific customizations may be implemented when the given user plays the online game via the virtual reality platform and/or the non-virtual reality platform. As such, the game provider may push users to participate in an online game via a virtual reality platform and/or a non-virtual reality platform based on the user's value when playing the online game via the given platform.

A system for determining and implementing platform specific online game customizations may include one or more servers. The servers may operate in a client/server architecture with one or more client computing platforms. The client computing platforms may be associated with the users of the online game. The servers may be configured to execute one or more of: a game component, an interaction component, a user component, a valuation component, a customization component, and/or other components. The client computing platforms may be configured to execute one or more components the same as or similar to the servers.

The game component may be configured to execute a game instance of an online game played via multiple platforms. The multiple platforms may include virtual reality platforms and non-virtual reality platforms. For example, the virtual reality platforms may include a first platform associated with a first user. The non-virtual reality platforms may include a second platform associated with the first user. The game component may be configured to use the game instance to generate game state information that is transmitted to the client computing platforms over a network. The game state information may facilitate presentation of views of the online game to the users via the client computing platforms. The game component may transmit the game state information over the network to the client computing platforms. Transmitting the game state information may cause the client computing platforms to present views of the online game. Views of the online game presented via a virtual reality platform may include views presented on a head-mounted display device and/or other immersive views (e.g., causing the user to have the perception of being physically present in a virtual world). Views of the online game presented via a non-virtual reality platform may include views presented on a touch screen, mobile device display, television, computer monitor, and/or other displays (e.g., not fully immersive displays such that the user does not have the perception of being physically present in a virtual world).

Interaction component 114 may be configured to monitor interactions of the users with the online game. The interaction component may monitor interactions of the users through the virtual reality platforms and/or the non-virtual reality platforms. For example, interactions of the first user with the online game when played through the first platform, the second platform, and/or any other platform may be monitored. Monitoring the interactions may include tracking and/or obtaining interaction information for storage in one or more user profiles associated with the users.

The user component may be configured to manage user profiles. The user profiles may include user information related to participating in the online game through the virtual reality platforms and/or the non-virtual reality platforms. The user information may include one or more of payment information, personal information, historic transaction information, character account information, platform information, and/or other information. The user information may be based on the interactions monitored. The user profiles may include a first user profile that includes user information for the first user. The user information for the first user may describe interactions of the first user with the online game when played through the first platform, the second platform, and/or any other platform.

The valuation component may be configured to determine user value metrics for the users on the virtual reality platforms and/or the non-virtual reality platforms. The user value metrics may indicate an economic value associated with a given user for a given platform. The valuation component may be configured to determine one or more of a first user value metric for the first user on the first platform (e.g., the virtual reality platform), a second user value metric for the first user on the second platform (e.g., the non-virtual reality platform), and/or other value metrics for the first user on other platforms. The valuation component may determine the user value metrics based on the user information stored in the user profiles. The first user value metric and the second user value metric may be determined based on the user information stored in the first user profile.

In some implementations, the user value metrics may include spend parameters. The spend parameters may indicate spending in the online game by individual ones of the users when playing the online game via the virtual reality platforms and/or the non-virtual reality platforms. The spend parameters may include one or more of: an amount of currency spent during a period of time, a total amount of currency spent, a spend velocity, an average amount of currency spent, a spend frequency, conversion rates of the different platforms, monetization through ads on the different platforms, and/or other spend parameters that impact value to the game provider.

The customization component may be configured to determine one or more platform specific game customizations for the online game. Platform specific customizations may include customizations and/or differences in the online game when played via a given platform associated with a user compared to when played via another platform associated with the user. One or more platform specific online game customizations may be determined based on the user value metrics for a given user. For example, a first game customization may be determined for the first platform (e.g., the virtual reality platform) and/or the second platform (e.g., the non-virtual reality platform) based on a comparison of the first user value metric and the second user value metric.

The platform specific customizations may include an alteration and/or customization of one or more aspects of the online game. The one or more aspects of the online game that may be customized may include one or more of: a reward, a strength and/or power of one or more user characters, a spawn rate or recovery rate of one or more user characters, a power of attacks, a resistance to attacks, speed or responsiveness of controlled units, a quality or effectiveness of virtual items, a quantity of available virtual items, availability of user actions, wait periods associated with one or more actions, and/or other customizations. The platform specific online game customizations may increase and/or decrease the difficulty of the online game when played via a given platform.

The customization component may be configured to implement one or more platform specific online game customizations determined. For example, the customization component may implement the first game customization that customizes one or more aspects of the online game for the first user when played via the first platform (e.g., the virtual reality platform) and/or when played via the second platform (e.g., the non-virtual reality platform). In some implementations, a user may and/or may not be made aware of the platform specific customizations. The customization component may be configured to effectuate presentation of a customization notification. The customization notification may include information indicating one or more of the customizations determined such that the first user is made aware that the first game customization impacts gameplay of the online game when played via the first platform or the second platform, but not when played via the non-customized platform. In some implementations, the user may not be made aware of a given game customization, and/or that the given game customization impacts gameplay of the online game when played via the first platform or the second platform, but not when played via a non-customized platform.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
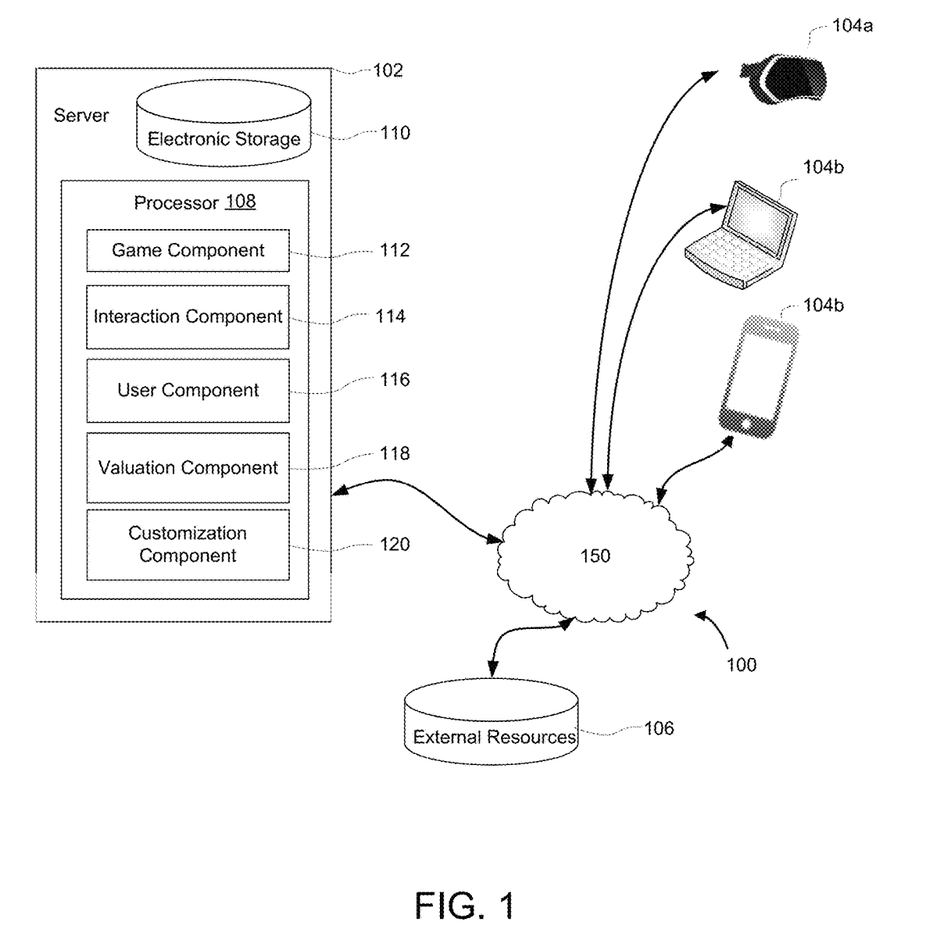
FIG. 1 illustrates a system for determining and implementing platform specific online game customizations, in accordance with one or more implementations.

FIG. 1 illustrates a system 100 that determines and implements platform specific online game customizations. The online game may be played via multiple client computing platforms. The client computing platforms may include virtual reality platforms and non-virtual reality platforms. The virtual reality platforms may present views of the online game in a manner that simulates immersion (e.g., the user's perception of being physically present within a non-physical world) within the online game. The online game may have a higher interactive potential when played via the virtual reality platforms than when played via the non-virtual reality platforms. For example, the virtual reality platforms may be able to support additional and/or increased motion inputs, views, visibility, and/or other interactions a user may have with the online game. As such, users may be more invested in the online game and willing to spend money in the online game when played via virtual reality platforms. However, the virtual reality platforms may also be more restrictive because a user may not always have access to a virtual reality platform or may be too distracted when playing the game via virtual reality to make purchases.

The online game may be provided and/or executed by system 100. Providing the online game may include hosting the online game over a network 150. In some implementations, system 100 may include one or more servers 102 configured for hosting online games. Server 102 may be configured to communicate with one or more client computing platforms 104 according to a client/server architecture, and with each other. The users may access system 100, the online game, and/or the game space associated with the online game via client computing platforms 104, such as client computing platforms 104*a-b* as shown. Client computing platforms 104 may include virtual reality platform(s) 104*a* and non-virtual reality platform(s) 104*b*. Server 102 may comprise a processor 108 configured to execute machine readable instructions to implement system components. The computer program components may include one or more of a game component 112, an interaction component 114, a user component 116, a valuation component 118, a customization component 120, and/or other components.

The game component 112 may be configured to execute a game instance of an online game played via multiple platforms. The online game may be played by users via virtual reality platforms and non-virtual reality platforms. The virtual reality platforms may include a first platform associated with a first user. The non-virtual reality platforms may include a second platform associated with the first user. The virtual reality platforms may provide an immersive gaming experience by simulating the user's presence within the online game (e.g., within a virtual space in which the online game is played). The game component 112 may be configured to use the game instance to generate game state information that is transmitted to client computing platforms 104 over a network 150. The game state information may facilitate presentation of views of the online game to the users via the client computing platforms.

Game component 112 may transmit the game state information over network 150 to the client computing platforms 104, causing client computing platforms 104 to present views of the online game. Views of the online game presented via virtual reality platform 104a may include views presented via a head-mounted display device. The views may be presented stereoscopically—one for each eye—via the head mounted display device and the user's brain combines them creating a three-dimensional experience. The head mounted display device may include a head and/or eye tracking system that tracks movement of the user as they move their head, eyes, and/or themselves around in physical space to select views and/or move about the online game (e.g., the virtual space in which the online game is played). Views of the online game presented via a non-virtual reality platform may include views presented on a display for one or more of a mobile device (e.g., a smart phone, tablet, laptop), desktop computer, gaming console, televisions, and/or other non-virtual reality platforms.

In some implementations, the game content for the online game provided to the users via the virtual reality platforms may be different than the game content provided to the users via the non-virtual reality platforms. For example, different, but related game content, may be provided to the users via the non-virtual reality platforms compared to the virtual reality platforms.

Execution of the game instance may enable interaction by the users with the online game and/or each other. Game component 112 may be configured to perform operations in the game instance in response to commands received over network 150 from client computing platforms 104. Users may participate in the online game through client game applications implemented on the client computing platforms 104 associated with the users.

Within the instance of the online game, users may interact with elements in the online game and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the online game by game component 112 may include determining a game state associated with the online game. The game state information may include information defining a virtual space in which the online game is played. The state may be communicated (e.g., via streaming visual data, via object/position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a virtual space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user. In some implementations, when the user is playing the online game via the virtual reality platforms, the view may be selected by the user based on their head and/or eye movement.

The instance of the online game may be persistent. That is, the online game may continue on whether or not individual users are currently logged in and/or participating in the online game. A user that logs out of the online game and then logs back in some time later may find the virtual space and/or the online game has been changed through the interactions of other users with the online game during the time the user was logged out. These changes may include changes to the simulated physical space, changes in the user's inventory, changes in other users' inventories, changes experienced by non-user characters, and/or other changes.

The online game may be played within a simulated virtual space, e.g., a virtual space that is accessible by users via clients (e.g., client computing platforms 104) that present the views of the virtual space to a user. The virtual space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise virtual entities automatically controlled in the online game. Such virtual entities may not be associated with any user. As such, the automatically controlled virtual entities may be generated and/or developed by artificial intelligence configured with the server(s) 102 by a provider, administrator, moderator, and/or any other entities related to the online game. These automatically controlled entities may evolve within the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with the server 102. As used herein, such automatically controlled virtual space entities in the instance of the online game are referred to as "non-player entities".

It should be understood the above description of the manner in which state of the virtual space associated with the online game as determined by game component 112 is not intended to be limiting. The game component 112 may be configured to express the virtual space in a more limited, or richer, manner. For example, views determined for the online game representing the game state of the instance of the online game may be selected from a limited set of graphics depicting an occurrence in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Within the instance of the online game executed by game component 112, the users may participate by controlling one or more of an element in the virtual space associated with the online game. The user-controlled elements may include avatars, user characters, virtual space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the online game.

In any case, the user-controlled elements may move through and interact with the virtual space (e.g., non-player entities, elements controlled by other users and/or topography in the virtual space) associated with the online game. The elements controlled by a given user may be created and/or customized by the given user. The given user may have an "inventory" of virtual goods and/or currency usable within the virtual space.

Controls of virtual elements in the online game may be exercised through commands input by a given user through and/or by client computing platforms 104. The given user may interact with other users through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the game component 112).

A given user may input commands with specific parameters to undertake specific deeds, actions, functions, spheres of actions and/or any other types of interactions within the virtual space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

In some implementations, when the online game is played via virtual reality 104a platform, a given user may input a broader range of commands compared to those available on non-virtual reality platform 104b. The input commands via the virtual reality platform 104a may include the user performing the action as an input command. The user may also be able to look around and/or move about the virtual space in which the online game is played.

The game component 112 may be configured to execute and/or perform user actions to facilitate participation of the users in the online game and/or with each other in response to receiving game commands input by the users. Execution and/or performance of the user action by the game component 112 may produce changes to the game state, which may reflect progresses and/or results of the user actions. In some examples, state changes caused by the execution of the user actions may be recorded in the electronic storage 110 to facilitate persistency throughout the instance of the online game. In some examples, execution of the user actions may not produce persistent changes to the game state (e.g., a user character jumping forward and backward successively may not produce any perceivable game state changes to other users).

Interaction component 114 may be configured to monitor interactions of the users with the online game. Interaction component 114 may monitor interactions of the users through the virtual reality platforms and/or the non-virtual reality platforms. For example, interaction of the first user with the online game through the first platform, the second platform, and/or any other platform may be monitored. Monitoring the interactions of the users may include monitoring, for a given user, one or more of: times at which the given user is logged in to the online game via a given platform; areas of the online game the given user views or interacts with or in via a given platform; other users the given user interacts with via a given platform; the nature and/or content of interactions of the given user with other users via a given platform; activities participated in within the online game when played via a given platform; level, powers, or skill attained in the online game; inventory items obtained in the online game via a given platform; settings associated with a given platform; spending of the users in the online game when playing via a given platform; and/or other interactions of the given user with the online game, a given platform (e.g., individual ones of the virtual reality platforms and/or the non-virtual reality platforms) and/or other users. Monitoring the interactions may include tracking and/or obtaining interaction information for storage in one or more user profiles associated with the users.

User component 116 may be configured to manage user profiles. The user profiles may include user information related to participating in the online game through the virtual reality platforms and/or the non-virtual reality platforms. The user information may be based on the interactions monitored by interaction component 114. The user profiles may include a first user profile that includes user information for the first user. The user information for the first user may describe interactions of the first user with the online game through the first platform, the second platform, and/or any other platform. User information may be stored in user accounts and/or profiles. User accounts may be an account on a game central server, linked to one or more of the virtual reality platforms and/or the non-virtual reality platforms, or within a peer-to-peer network that contains a user profile.

The user profiles may include, for example, personal information identifying users (e.g., a username or handle, a number, an identifier, and/or other identifying information) within the online game, payment information (e.g., information associated with a method of payment and/or an account, and/or whether a payment method has been established for a given platform), security login information (e.g., a login code or password), online game account information, subscription information, character account information (e.g., user characters associated with the user, a status and/or characteristics of the user characters, a level of the user characters, etc.), platform information (e.g., virtual reality platform(s) and/or non-virtual reality platforms associated with a user), virtual currency account information (e.g., related to currency held in credit for a user), relationship information (e.g., information related to relationships between users in the online game), inventory information, online game usage information, demographic information associated with users, interaction history among users in the online game, information stated by users, purchase information of users, browsing history of users, a virtual reality client computing platform identification associated with a user, a non-virtual reality client computing platform identification associated with a user, and/or other information related to users.

The user component 118 may be configured to store inventories of virtual items including resources that are available to users in the online game. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

User component 118 may maintain an inventory for the user's character in which virtual awards may be collected. Players may collect, trade, buy, fight over items, and/or perform other actions to add to their inventory. Users in the online game may acquire virtual currency. In such games, the virtual currency might be represented by virtual coins, virtual cash, or by a number or value stored by the server for that user's benefit. Such virtual currency represents units of value for use in the online game system. Virtual currency may be purchased in one or more actual cash or credit transactions by a user, where the real world currency is transferred using a credit/debit/charge card transaction conveyed over a financial network. A user may earn virtual currency by taking action in the game. For example, a user may be rewarded with one or more units of virtual currency after completing a task, quest, challenge, or mission within the game.

Virtual currency may be used to purchase one or more in-game assets or other benefits. For example, a player may be able to exchange virtual currency and/or real-currency for a desired level, access, right, or item in an online game. Multiple types of virtual currency may be available for purchase from the game system operator. For example, an online game may have virtual gold coins and virtual cash. The different types of virtual currency may have different exchange rates with respect to real-world currency and each other. In some embodiments, certain types of virtual currency can be acquired by engaging in various in-game actions while other types of virtual currency can only be acquired by exchanging real-world currency.

The user information may include payment information for individual ones of the users and/or the platforms. The payment information for a given user may indicate whether the user has established a payment method for individual ones of the virtual reality platforms and/or the non-virtual reality platforms. The payment information may include account information for facilitating payments in the online game via individual ones of the virtual reality platforms and/or the non-virtual reality platforms. For example, the payment information for the first user may indicate whether the first user has established a method of payment (e.g., an account enabling a user to make purchases) in the first platform and/or the second platform.

The user information in the user account associated with the given user for the online game may include historic transaction information indicating previous spending by the user in the online game via a given platform. In some exemplary implementations, such historic transaction information may reflect various statistics and details about the individual spending by the user via individual ones of the virtual reality platform(s) and/or the non-virtual reality platform(s). Examples of such statistics may include purchases made within the online game when played via a given platform, when purchases were made in the online game when played via a given platform, an amount of virtual and/or real currency spent, a number of times a user spends virtual and/or real currency in exchange for virtual items (e.g., a number of transactions), a frequency of such spending by the user with in a time period of interest (e.g., past 24 hours, past week, past month, etc.), a spend velocity (e.g., rate of spending), and/or any other statistics. For example, historic transaction information for the first user may include that the first user spent a first amount of virtual currency in the online game via a first platform (e.g., the virtual reality platform) and a second amount of virtual currency in the online game via the second platform (e.g., non-virtual reality platform).

The valuation component 118 may be configured to determine user value metrics for the users on the virtual reality platforms and/or the non-virtual reality platforms. The user value metrics may indicate an economic value associated with a given user. The user value metrics may be associated with individual platforms such that a user value metric for a user for a given platform indicates the value associated with that user when playing the online game via the given platform. The economic value may include a valuation, potential economic value, and/or prediction of a value a given user may represent to a game provider. The value metrics may include a first user value metric, second user value metric, and/or any other value metrics. Valuation component 118 may determine the user value metrics based on the user information stored in the user profiles. Valuation component 118 may be configured to determine one or more of a first user value metric for the first user on the first platform (e.g., the virtual reality platform), a second user value metric for the first user on the second platform (e.g., the non-virtual reality platform), and/or other value metrics for the first user on other platforms. The first user value metric and the second user value metric, for the first user, may be determined based on the user information stored in the first user profile.

In some implementations, the user value metrics may include spend parameters. The spend parameters may indicate spending in the online game by individual ones of the users on the virtual reality platforms and/or the non-virtual reality platforms. For example, a first spend parameter indicating spending in the online game by the first user on the first platform (e.g., the virtual reality platform), may be determined. A second spend parameter indicating spending in the online game by the first user on the second platform (e.g., the non-virtual reality platform) may be determined. In some implementations, the spend parameters for a given user may be determined based on the payment information and/or the historic transaction information stored and/or included in the user profile for the given user. The spending by a given user on a given platform may indicate past user spending and/or any other type of spending by the given users on the platforms. The past user spending may comprise one or more of: virtual currency and real world currency and/or any other type of currency. Valuation component 118 may be configured such that the spend parameters determined include one or more of: an amount of currency spent during a period of time, a total amount of currency spent, a spend velocity, an average amount of currency spent, a spend frequency, monetization through ads via the different platforms, and/or other spend parameters that impact value to the game provider.

In some implementations, the user value metric may quantify one or more of a progress within the online game via a given platform, a power level within the online game via a given platform, a skill level within the online game via a given platform, a level of virtual technology advancement within the online game via a given platform, success within the online game via a given platform as a whole or within certain types of gameplay (e.g., player-versus-player gameplay, player-versus-environment gameplay, harvesting gameplay, and/or other gameplay types), and/or other aspects. A user value metric can be classified as a status metric or a predictive metric. A status metric characterizes behavioral information of a set of on-line entities where the behavioral information is related to at least one activity of the on-line entities within the online game. Example status metrics include, without limitation, a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric as well as other metrics. These metrics are subsequently briefly described.

A predictive metric can, for example, evaluate the change in a status metric over time. Example predictive metrics include, without limitation: a churn metric, compatibility metric, a scheduling metric, a content consumption metric, an environmental balance metric, a survival metric, and an economic metric. Churn metrics predict the probability of a user leaving the online game, based on the user's past interaction patterns. Compatibility metrics indicate whether or not a user's play style will match a proposed player association or whether the user's play style matches that of the user association to which he/she is a member. Scheduling metrics predict the probability of a player being available for a future joint activity, so that such activities can be planned in advance. Content consumption metrics predict when users will have exhausted the online game virtual environment's resources, in order to plan timely expansions to the online game. Environmental balance metrics predict the effects of a design change on the online game, such as removing a given "profession" or certain items from the online game. Economic metrics predict inflation, trade volume, and other variables in order to maintain the balance of trade in the online game. The survival metric indicates the health of a user association.

The predictive metrics can include those that develop a time-series of single or combinations of status metrics (weighted or un-weighted) that represent trends; metrics that represent heuristically determined conditions relevant to the predicted health of the online game; metrics based on a vector of attributes representing characteristics of the on-line entity such that the vectors can be used to classify on-line entities and to determine the characteristics of successful on-line entities; and to determine whether on-line entities have characteristics that are progressing toward or away from the characteristics of successful online entities.

The predictive metrics can timely measure the social aspects of user interactions in the online game, and measure and/or monitor the health of the online user community in the online game. By using the predictive metrics, the MMOG provider can alter the online game when played via a given platform to encourage desired social interactions and to discourage less desired social interactions.

Customization component 120 may be configured to determine one or more platform specific game customizations for the online game. The platform specific customizations may be determined for the online game when played via the virtual reality platforms and/or the non-virtual reality platforms. Platform specific customizations may include customizations and/or differences in the online game when the game is played via a given platform associated with a user compared to when the game is played via another platform associated with the user. For example, the platform specific customizations may include a customization for the online game when played via the virtual reality platform, but not when played via the non-virtual reality platform; or, when played via the non-virtual reality platform, but not when played via the virtual reality platform. In some implementations, the online game may be customized when played via both the virtual reality platform and the non-virtual reality platform, wherein the customizations may be different. The platform specific customizations may be based on the user value metrics determined for the users. Customization component 120 and/or valuation component 118 may be configured to compare a first user value metric for an individual user when playing the game via a virtual reality platform and a second user value metric for the individual user when playing the game via a non-virtual reality platform. The comparison may be used to determine one or more platform specific customizations for the individual user via one or both of the platforms. For example, a first game customization may be determined for the first platform and/or the second platform based on a comparison of the first user value metric and the second user value metric.

The platform specific customizations may include an alteration and/or customization of one or more aspects of the online game related to: the virtual space in which the online game is played, the user-controlled entities within the online game, the non-user controlled entities within the online game, the virtual items and/or resources in the online game, the actions available to the user, and other areas of the online game. For example, the one or more aspects of the online game that may be customized may include one or more of: a reward, a strength and/or power of one or more user characters, a spawn rate or recovery rate of one or more user characters, a power of attacks, a resistance to attacks, speed or responsiveness of controlled units, a quality or effectiveness of virtual items, a quantity of available virtual items, availability of user actions, wait periods associated with one or more actions, and/or other customizations.

The platform specific online game customizations may increase and/or decrease the difficulty of the online game when played via a given platform. For example, the first game customization may increase and/or decrease the difficulty of the online game when played by the first user via the first platform or the second platform, in comparison to when the online game is played by the first user via the non-customized platform (e.g., either the first platform or the second platform, whichever is not customized). Increasing and/or decreasing difficulty of the online game when played via a given platform may be relative to when the online game is played via another platform. Adjusting the difficulty may include adjusting the convenience, play speed, effort and/or stamina required, likelihood of obtaining a desired outcome, and/or other ways the difficulty of the online game may be adjusted.

By way of non-limiting example, responsive to a user spending a larger amount of currency in the online game via the non-virtual reality platform than via the virtual reality platform, a game customization may include increasing the wait times associated with one or more actions in the online game when played via the virtual reality platform but not adjusting the wait times in the non-virtual reality platform. As such, based on the user value metric (e.g., a spend parameter) the platform specific online game customization may make playing the online game via the virtual reality platform more difficult.

By way of another non-limiting example, responsive to the user information for a given user indicating the given user has established a payment method in the virtual reality platform but not has not established a payment method in the non-virtual reality platform, a platform specific online game customization determined may include decreasing the resistance to attacks in the online game when played when played via the virtual reality platform. As such, based on the user value metric (e.g., payment information) the platform specific online game customization may make playing the online game via the virtual reality platform more difficult such that a user may be more likely to pay to increase their resistance to attacks.

Customization component 120 may be configured to implement one or more platform specific online game customizations determined. For example, customization component 120 may implement the first game customization that customizes one or more aspects of the online game for the first user when played via the first platform (e.g., the virtual reality platform) and/or the second platform (e.g., the non-virtual reality platform). Customization component 120 may be configured to communicate with game component 112 in order to execute the instance of the game including the game customizations determined.

In some implementations, a user may and/or may not be made aware of the platform specific customizations. Customization component 120 may be configured to effectuate presentation of a customization notification. The customization notification may include information indicating one or more of the customizations determined. Information indicating the first game customization may be presented via the first platform such that the first user is made aware that the first game customization impacts gameplay of the online game when played via the first platform or the second platform, but not when played via the non-customized platform. In some implementations, the user may not be made aware of one or more of the platform specific online game customizations. For example, the first user may not be made aware of the first game customization and/or that the first game customization impacts gameplay of the online game when played via the first platform or the second platform, but not when played via a non-customized platform.

Figure 2A:
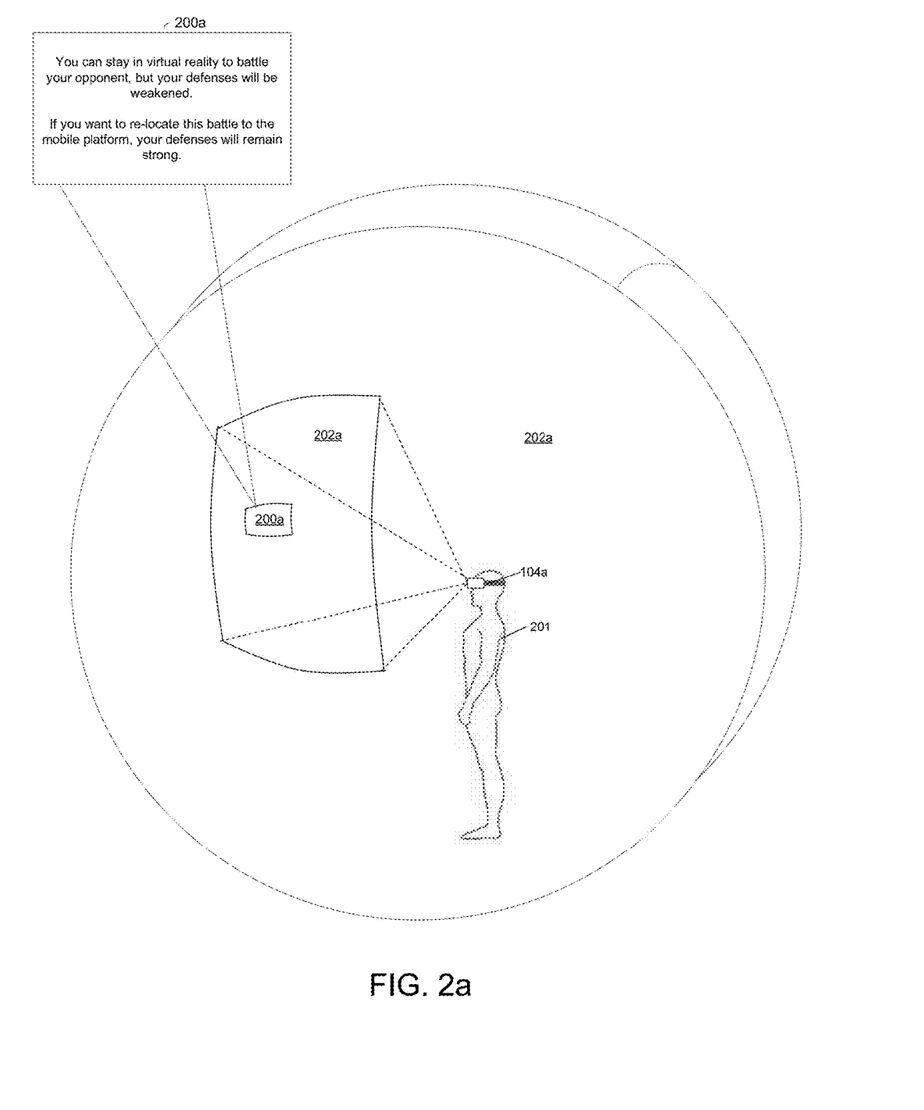
FIG. 2a depicts a customization notification including information indicating a platform specific customization in the online game when played via a virtual reality platform, in accordance with some implementations.

FIG. 2a depicts a customization notification 200a including information indicating a platform specific customization in the online game when played via a virtual reality platform 104a, in accordance with some implementations. Customization notification 200a may be presented within views 202a of the online game presented to user 201 via virtual reality platform 104a. Presentation of customization notification 200a may cause user 202a to be made aware of the platform specific customization. Customization notification 200a may indicate that the platform specific customization impacts gameplay of the online game when played via virtual reality platform 104a, but not when played via a non-virtual reality platform (e.g., the same as or similar to non-virtual reality platform 104b).

Figure 2B:
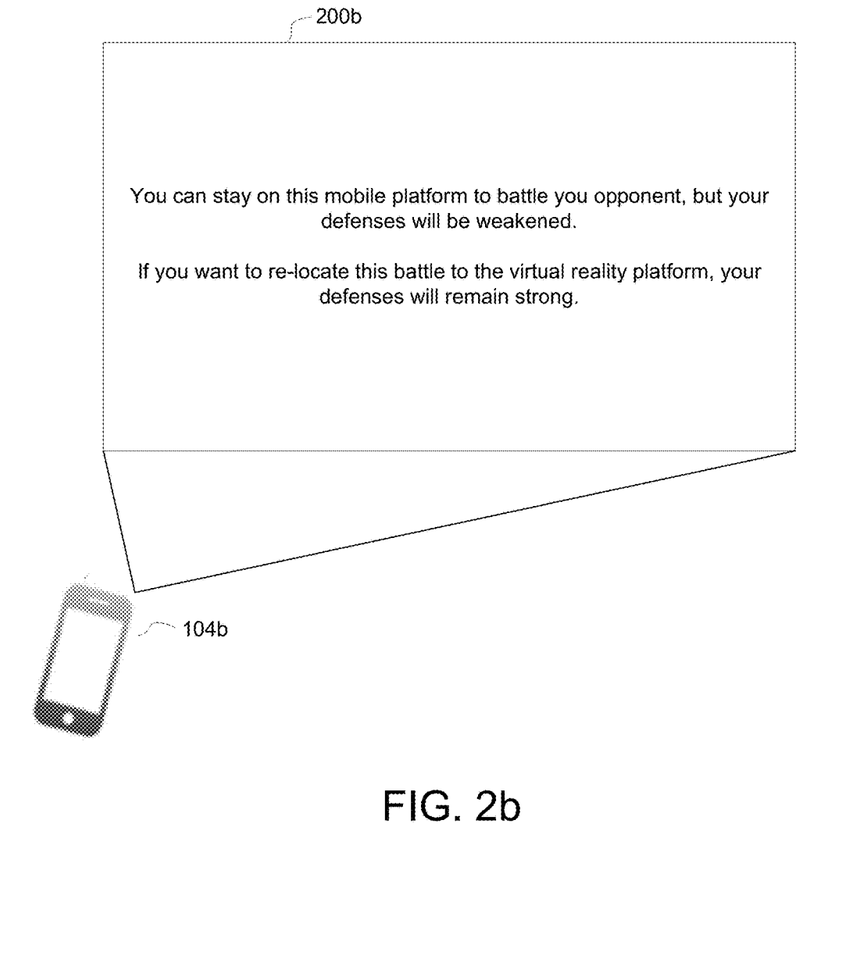
FIG. 2b depicts a customization notification including information indicating a platform specific customization in the online game when played via non-virtual reality platform, in accordance with some implementations.

FIG. 2b depicts a customization notification 200b including information indicating a platform specific customization in the online game when played via non-virtual reality platform 104b, in accordance with some implementations. Customization notification 200b may be presented within views 202b of the online game presented to the user (e.g., the same as or similar to user 201) via non-virtual reality platform 104b. Presentation of customization notification 200b may cause user 202b to be made aware of the platform specific customization. Customization notification 200b may indicate that the platform specific customization impacts gameplay of the online game when played via non-virtual reality platform 104b, but not when played via a virtual reality platform (e.g., the same as or similar to virtual reality platform 104a).

Returning to FIG. 1, the client computing platform(s) 104 may include one or more processors, memory, display devices, head-mounted display devices, sensors, and/or any other components. The processor(s) may be configured to execute machine-readable instructions to launch and/or implement one or more client game applications associated with the online games. In some implementations, the machine-readable instructions may cause the processors of one of more client computing platforms to perform functionality the same as or similar to the functionality performed by one or more components of system 100.

The client computing platform(s) 104 may be configured to: present a graphical representation of the virtual space (e.g., a virtual reality representation and/or a non-virtual reality representation) corresponding to a given online game; provide controls and/or sense input commands enabling the given user to maneuver virtual items, initiate actions, and/or purchase virtual item(s) usable in the online game(s) within the virtual space associated with the online game; determine information for implementing game interfaces for the online game(s) hosted by system 100; obtain state information regarding a given online game hosted by the system 100; determine view information (e.g., a view point, field of view, eye/head movement, and/or location) of the user at a given time; determine a level of rendering of a scene in the online game based on the state information and view information; determining one or more action menus for presentation to the user in the game interface; facilitate interaction by the given user in the online game(s) and/or interaction with other users; communicate with sever(s) 102 (e.g., receive and/or transmitting information to/from servers 102); and/or provide any other functionality. In some implementations, client computing platform 104 may be a virtual reality platform and/or a non-virtual reality platform. Client computing platform 104 may be configured to communicate with, transmit information to, and/or receive information from one or more of servers 102, and/or other components of system 100.

The server(s) 102, client computing platform(s) 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a virtual reality system, a head-mounted virtual reality display, desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server(s) 102 may include electronic storage 110, one or more processors 108, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 110 may comprise electronic storage media that electronically stores information. The electronic storage media of electronic storage 110 may include one or both of system storage that is provided integrally (i.e., substantially non-removable) with server(s) 102 and/or removable storage that is removably connectable to server(s) 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Electronic storage 110 may include one or more virtual storage resources (e.g., cloud storage, a virtual private network, and/or other virtual storage resources). Electronic storage 110 may store software algorithms, information determined by processor 108, information received from server(s) 102, information received from client computing platforms 104, and/or other information that enables server(s) 102 to function as described herein.

Processor(s) 108 is configured to provide information processing capabilities in server(s) 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120. Processor 108 may be configured to execute components 112, 114, 116, 118, 120 by software; hardware; firmware; some combination of software, hardware, and/or firmware; and/or other mechanisms for configuring processing capabilities on processor 108.

It should be appreciated that although components 112, 114, 116, 118, 120 are illustrated herein as being co-located within a single processing unit, in some other implementations, one or more of components 112, 114, 116, 118, 120 may be located remotely from the other components. The description of the functionality provided by the different components 112, 114, 116, 118, 120 described below is for illustrative purposes, and is not intended to be limiting, as any of components 112, 114, 116, 118, 120 may provide more or less functionality than is described. For example, one or more of components 112, 114, 116, 118, 120 may be eliminated, and some or all of its functionality may be provided by other ones of components 112, 114, 116, 118, 120. As another example, processor 108 may be configured to execute one or more additional components that may perform some or all of the functionality attributed below to one of components 112, 114, 116, 118, 120.

Figure 3:
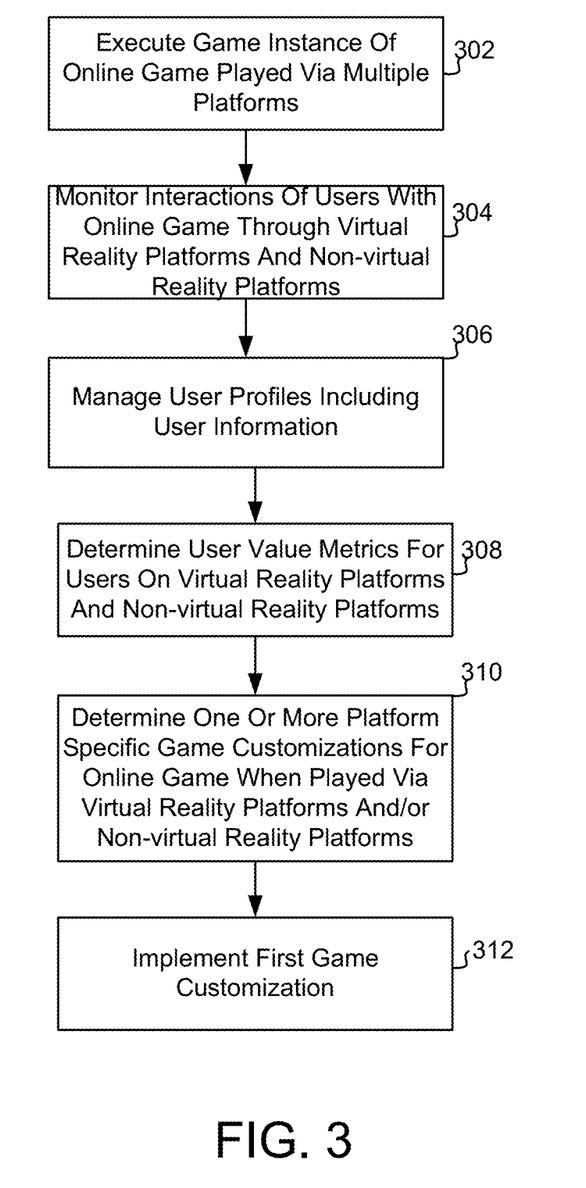
FIG. 3 illustrates a method for determining and implementing platform specific online game customizations, in accordance with one or more implementations.

FIG. 3 illustrates a method for determining and implementing platform specific online game customizations, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 300 illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a game instance of the online game played via multiple platforms may be executed. The game instance may be used to generate game state information that is transmitted to client computing platforms over a network. The game state information may facilitate presentation of views of the online game to the users via the client computing platforms. Execution of the game instance further enables interaction by the users with the online game and/or each other by performing operations in the game instance in response to commands received over the network from the client computing platforms. The client computing platforms may include virtual reality platforms and non-virtual reality platforms. The virtual reality platforms may include a first platform associated with a first user. The non-virtual reality platforms may include a second platform associated with the first user. In some implementations, operation 302 may be performed by a game component the same as or similar to game component 112 (shown in FIG. 1 and described herein).

At an operation 304, interactions of the users with the online game through the virtual reality platforms and/or the non-virtual reality platforms may be monitored. As such, interaction of the first user with the online game through the first platform and/or the second platform may be monitored. In some implementations, operation 304 may be performed by an interaction component the same as or similar to interaction component 114 (shown in FIG. 1 and described herein).

At operation 306, user profiles including user information may be managed. The user information may relate to participating in the online game through the virtual reality platforms and/or the non-virtual reality platforms. The user information may be based on the monitored interactions. The user profiles may include a first user profile that includes user information for the first user. The user information for the first user may describe interaction of the first user with the online game through the first platform and/or the second platform. In some implementations, operation 306 may be performed by a user component the same as or similar to user component 116 (shown in FIG. 1 and described herein).

At operation 308, user value metrics for the users may be determined. User value metrics for the users on the virtual reality platforms and/or the non-virtual reality platforms may be determined. A first user value metric for the first user on the first platform, and/or a second user value metric for the first user on the second platform may be determined. The first user value metric and/or the second user value metric may be determined based on the user information stored in the first user profile. In some implementations, operation 308 may be performed by a valuation component the same as or similar to valuation component 118 (shown in FIG. 1 and described herein).

At operation 310, one or more platform specific online game customizations for the online game when played via the virtual reality platforms and/or the non-virtual reality platforms may be determined. The platform specific customizations may be determined based on the user value metrics determined for the users. A first game customization may be determined for the first platform and/or the second platform. The first game customization may be determined based on a comparison of the first user value metric and the second user value metric. In some implementations, operation 310 may be performed by a customization component the same as or similar to customization component 120 (shown in FIG. 1 and described herein).

At operation 312, the first game customization may be implemented. The first game customization may customize one or more aspects of the online game for the first user when played via the first platform and/or the second platform. In some implementations, operation 312 may be performed by a customization component the same as or similar to customization component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that determines and implements platform specific online game customizations, the system comprising:
one or more physical computer processors configured by machine-readable instructions to:
execute a game instance of the online game played via multiple platforms, and use the game instance to generate game state information that is transmitted to client computing platforms over a network, the game state information facilitating presentation of views of the online game to the users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform associated with a first user and the non-virtual reality platforms including a second platform associated with the first user;
monitor interactions of the users with the online game through the virtual reality platforms and the non-virtual reality platforms such that interaction of the first user with the online game through the first platform and the second platform is monitored;

manage user profiles including user information related to participating in the online game through the virtual reality platforms and the non-virtual reality platforms such that the user information is based on the monitored interactions, the user profiles including a first user profile that includes user information for the first user that describes interaction of the first user with the online game through the first platform and the second platform;

determine user value metrics for the users on the virtual reality platforms and the non-virtual reality platforms, wherein a first user value metric for the first user on the first platform and a second user value metric for the first user on the second platform are determined based on the user information stored in the first user profile;

determine one or more platform specific online game customizations for the online game when played via the virtual reality platforms and/or the non-virtual reality platforms based on the user value metrics determined for the users, wherein a first game customization is determined for the first platform or the second platform based on a comparison of the first user value metric and the second user value metric; and implement the first game customization that customizes one or more aspects of the online game for the first user when played via the first platform or the second platform, wherein the first game customization increases or decreases the difficulty of the online game when played by the first user via the first platform or the second platform in comparison to when the online game is played by the first user via a non-customized platform.

2. The system of claim 1, wherein the one or more physical computer processors are further configured by machine-readable instructions to:

transmit the game state information over the network causing the first platform to present the views of the online game to the first user via a headset display device associated with the first platform.

3. The system of claim 1, wherein the user value metrics include spend parameters that indicate spending in the online game by individual ones of the users on the virtual reality platforms and the non-virtual reality platforms, such that a first spend parameter indicating spending in the online game by the first user on the first platform and a second spend parameter indicating spending in the online game by the first user on the second platform, are determined.

4. The system of claim 3, wherein the spend parameters obtained include one or more of an amount of currency spent during a period of time, a total amount of currency spent, a spend velocity, an average amount of currency spent, and/or a spend frequency.

5. The system of claim 1, wherein the user information includes payment information such that the user value metrics indicate whether the users have established a method of payment in one or more of the virtual reality platforms and/or the non-virtual reality platforms.

6. The system of claim 1, wherein the one or more processors are further configured by machine-readable instructions to:

effectuate presentation of a customization notification, the customization notification including information indicating the first game customization via the first platform such that the first user is made aware that the first game customization impacts gameplay of the online game when played via the first platform or the second platform, but not when played via a non-customized platform.

7. The system of claim 1, wherein the first user is not made aware of the first game customization and/or that the first game customization impacts gameplay of the online game when played via the first platform or the second platform, but not when played via a non-customized platform.

8. The system of claim 1, wherein the one or more aspects of the online game that are customized include one or more of a reward, a strength and/or power of one or more user characters, a spawn rate or recovery rate of one or more user characters, power of attacks, resistance to attacks, speed or responsiveness of controlled units, a quality or effectiveness of virtual items, a quantity of available virtual items, wait periods associated with one or more actions, and/or availability of user actions.

9. A computer-implemented method that determines and implements platform specific online game customizations, the method being implemented by a computer system including one or more physical processors configured by machine-readable instructions, the method comprising:

executing a game instance of the online game played via multiple platforms, and use the game instance to generate game state information that is transmitted to client computing platforms over a network, the game state information facilitating presentation of views of the online game to the users via the client computing platforms, wherein execution of the game instance further enables interaction by the users with the online game and/or each other by performing operations in the game instance in response to commands received over the network from the client computing platforms, wherein the client computing platforms include virtual reality platforms and non-virtual reality platforms, the virtual reality platforms including a first platform associated with a first user and the non-virtual reality platforms including a second platform associated with the first user;

monitoring interactions of the users with the online game through the virtual reality platforms and the non-virtual reality platforms such that interaction of the first user with the online game through the first platform and the second platform is monitored;

managing user profiles including user information related to participating in the online game through the virtual reality platforms and the non-virtual reality platforms such that the user information is based on the monitored interactions, the user profiles including a first user profile that includes user information for the first user that describes interaction of the first user with the online game through the first platform and the second platform;

determining user value metrics for the users on the virtual reality platforms and the non-virtual reality platforms, wherein a first user value metric for the first user on the first platform and a second user value metric for the first user on the second platform are determined based on the user information stored in the first user profile;

determining one or more platform specific online game customizations for the online game when played via the virtual reality platforms and/or the non-virtual reality platforms based on the user value metrics determined for the users, wherein a first game customization is determined for the first platform or the second platform based on a comparison of the first user value metric and the second user value metric; and implementing the first game customization that customizes one or more aspects of the online game for the first user when played via the first platform or the second platform, wherein the first game customization increases or decreases the difficulty of the online game when played by the first user via the first platform or the second platform in comparison to when the online game is played by the first user via a non-customized platform.

10. The method of claim 9, further comprising:

transmitting the game state information over the network causing the first platform to present the views of the online game to the first user via a headset display device associated with the first platform.

11. The method of claim 10, wherein the user value metrics include spend parameters that indicate spending in the online game by individual ones of the users on the virtual reality platforms and the non-virtual reality platforms, such that a first spend parameter indicating spending in the online game by the first user on the first platform and a second spend parameter indicating spending in the online game by the first user on the second platform, are determined.

12. The method of claim 11, wherein the spend parameters obtained include one or more of an amount of currency spent during a period of time, a total amount of currency spent, a spend velocity, an average amount of currency spent, and/or a spend frequency.

13. The method of claim 11, wherein the user information includes payment information such that the user value metrics indicate whether the users have established a method of payment in one or more of the virtual reality platforms and/or the non-virtual reality platforms.

14. The method of claim 12, further comprising:

effectuating presentation of a customization notification, the customization notification including information indicating the first game customization via the first platform such that the first user is made aware that the first game customization impacts gameplay of the online game when played via the first platform or the second platform, but not when played via a non-customized platform.

15. The method of claim 13, wherein the first user is not made aware of the first game customization and/or that the first game customization impacts gameplay of the online game when played via the first platform or the second platform, but not when played via a non-customized platform.

16. The method of claim 14, wherein the one or more aspects of the online game that are customized include one or more of a reward, a strength and/or power of one or more user characters, a spawn rate or recovery rate of one or more user characters, power of attacks, resistance to attacks, speed or responsiveness of controlled units, a quality or effectiveness of virtual items, a quantity of available virtual items, wait periods associated with one or more actions, and/or availability of user actions.

* * * * *

UNITED STATES PATENT AND TRADEMARK OFFICE
CERTIFICATE OF CORRECTION

PATENT NO. : 10,096,204 B1
APPLICATION NO. : 15/048903
DATED : October 9, 2018
INVENTOR(S) : Kent Wakeford et al.

Page 1 of 1

It is certified that error appears in the above-identified patent and that said Letters Patent is hereby corrected as shown below:

In the Claims

Column 21, Line 18, In Claim 11, change "10," to --9,--.

Column 22, Line 1, In Claim 13, change "11," to --9,--.

Column 22, Line 6, In Claim 14, change "12," to --9,--.

Column 22, Line 15, In Claim 15, change "13," to --9,--.

Column 22, Line 21, In Claim 16, change "14," to --9,--.

Signed and Sealed this
Twenty-eighth Day of May, 2019

Andrei Iancu
*Director of the United States Patent and Trademark Office*